United States Patent Office 2,748,875
Patented June 5, 1956

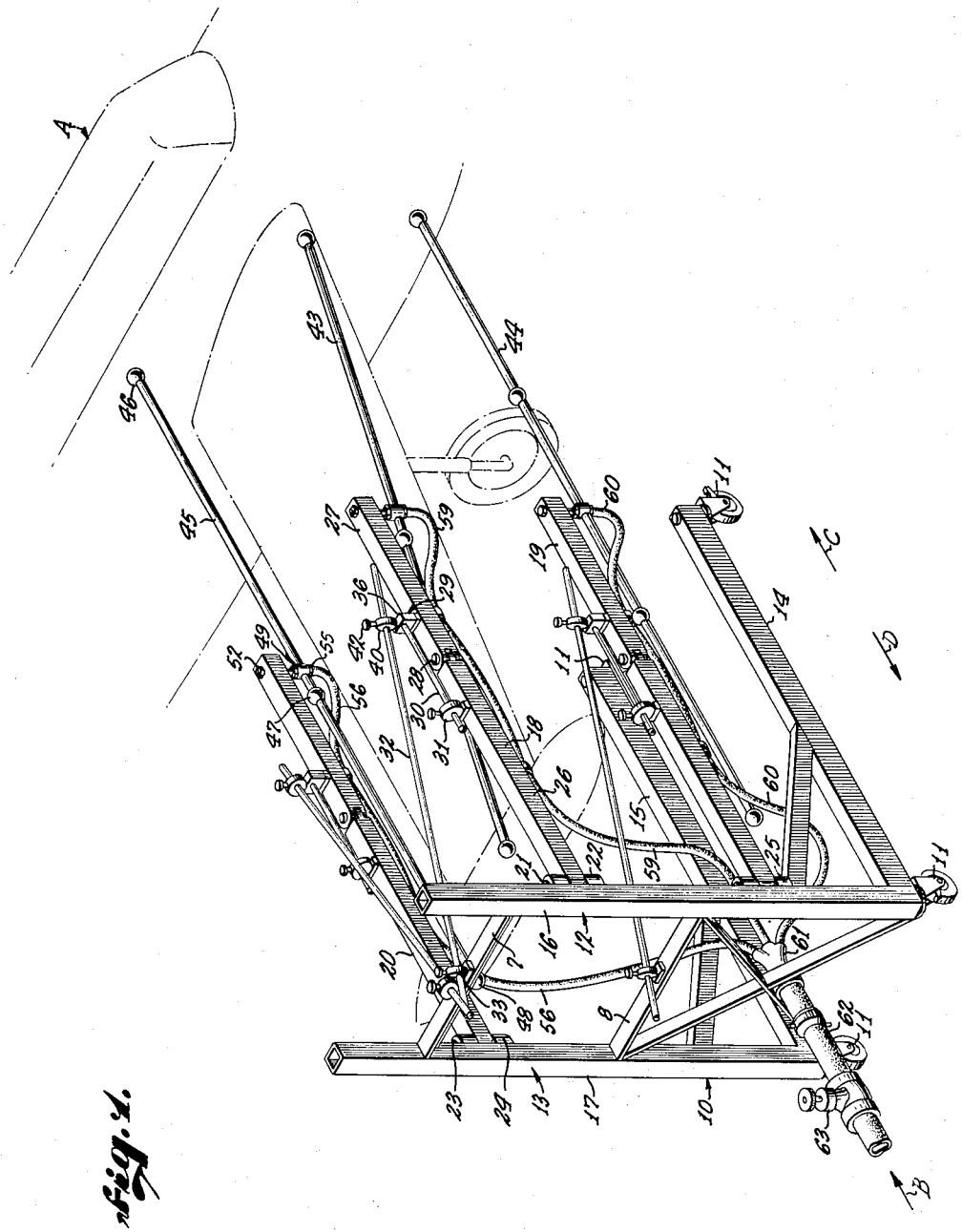

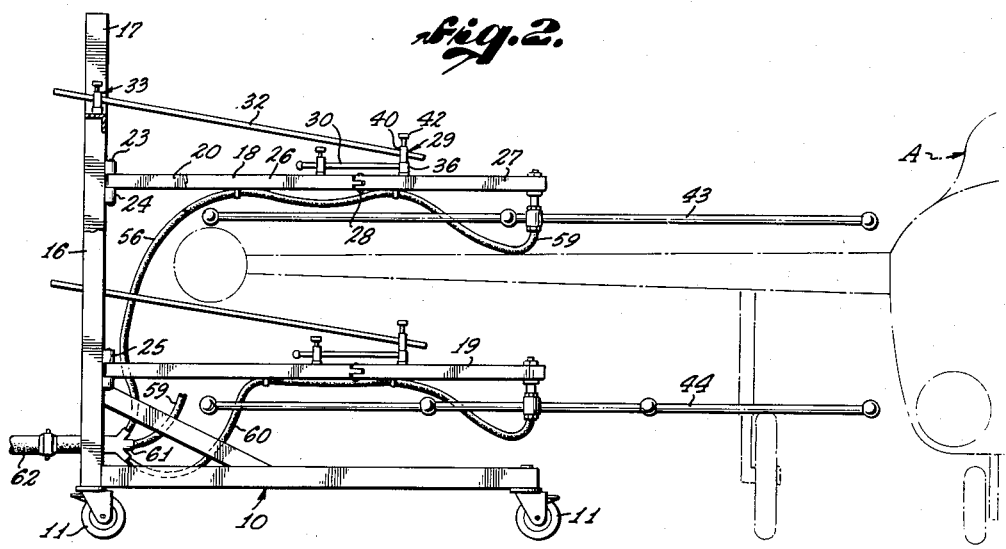
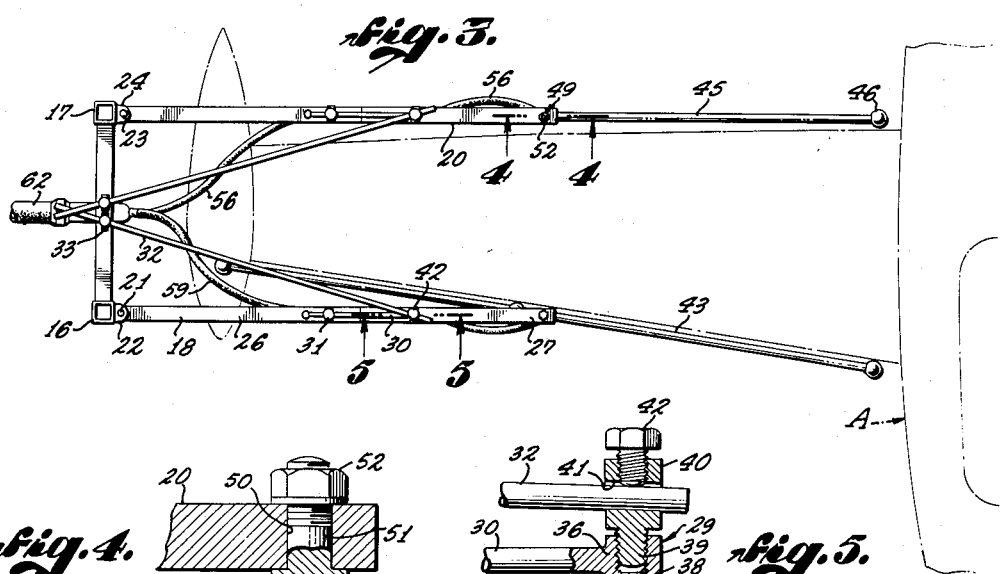
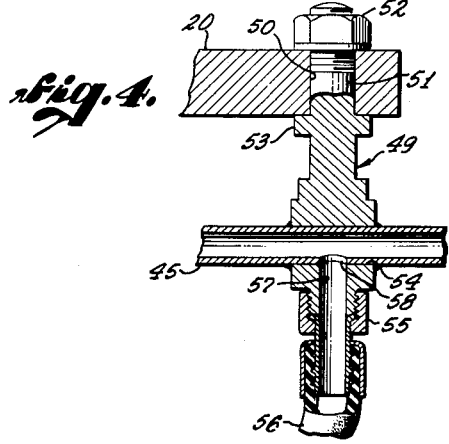
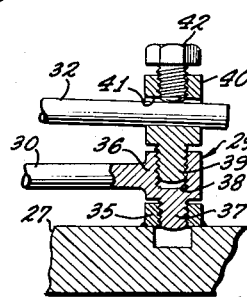
JOSEPH B. TRINITY &
RICHARD E. BATES,
INVENTORS.

2,748,875

FIRE EXTINGUISHING APPARATUS

Joseph B. Trinity, Los Angeles, and Richard E. Bates, Santa Monica, Calif.

Application October 23, 1953, Serial No. 387,872

7 Claims. (Cl. 169—2)

This invention relates to a fire extinguishing apparatus and more particularly to an apparatus for use in extinguishing fires which start during the testing of aircraft fuel systems or during refueling thereof.

Fuel consumed by aircraft engines vaporizes readily and is therefore highly combustible. When a new or reconditioned airplane is being checked preliminary to its first flight, the fuel system thereof is usually tested for leaks and proper function. In the event a leak occurs in the fuel system during such a test or during refueling thereof, a fire may start and progress very rapidly due to the volatile nature of the fuel. Such fires generally start in the aircraft wing region wherein the fuel system tanks are located and the fire spreads rapidly around the wing due to vaporization of the fuel caused by heat of the fire. Fires of this nature are particularly difficult to control or extinguish with present equipment and methods, because the fireman cannot employ the same quickly enough, and also efficiently enough, to envelop the entire wing area all at once, the instant fire breaks out.

With equipment, according to the present invention, fuel fires in the wing and fuselage region of an aircraft may be easily and quickly extinguished. This equipment is provided with numerous fog nozzles which may be conveniently arranged in close proximity to and in substantially coextensive relation with the upper and lower surfaces of an aircraft wing when a fuel system test is being made or during refueling of the tanks therein. A single quick acting valve is arranged to supply fluid to the nozzles almost instantly when desired, whereby a fire at any portion of the wing may be completely enveloped by extinguishing fog. In addition to the complete wing surrounding nozzle fog arrangement, operated according to the present invention, the unitary supporting structure may be easily moved into position relative to an airplane or the airplane may be moved relative to it, without adjustment or disturbance of the equipment.

The invention has the advantage of being readily and easily adjustable to intimately correspond with various aircraft wing configurations so that it may be prearranged to accommodate a particular aircraft during fuel system tests or during refueling operations. Airplanes, which are very expensive and vitally needed for national defense, may be more quickly and safely tested and serviced when accompanied by the use of the present invention.

Numerous advantages of the invention will be recognized with reference to the specification, claims and drawings forming a part of this application in which, Figure 1 is a perspective view of the fire extinguishing apparatus, according to the present invention, showing by broken lines the position of an aircraft when the apparatus is in operative position relative thereto.

Figure 2 is a side elevational view of the fire extinguishing apparatus showing by dash lines a fragmentary portion of an airplane when positioned in operative relation to the fire extingushing apparatus.

Figure 3 is a top or plan view of the fire extinguishing apparatus illustrating by dash lines a portion of an aircraft relative thereto.

Figure 4 is an enlarged fragmentary sectional view taken from the line 4—4 of the Figure 3; and Figure 5 is an enlarged fragmentary sectional view taken from line 5—5 of Figure 3.

The fire extinguishing apparatus of the present invention, referring now to Figure 1 of the drawing, is provided with a frame 10 having caster wheels 11 which are conventional locking casters adapted to be fixed against rotation in order to prevent inadvertant movement of the frame 10 when in a desired location relative to the aircraft as illustrated by dash lines A. The frame 10 is composed of a pair of L-shaped support elements 12 and 13 having horizontal portions 14 and 15, respectively. Extending vertically from the horizontal portions 14 and 15 are arm supporting portions 16 and 17, respectively which are interconnected by cross members 7 and 8. Pivotally mounted on the vertically disposed arm supporting portion 16 of the frame 10 are arms 18 and 19.

The arm 18 is arranged at sufficient elevation to extend above the normally upper surface of an aircraft wing while the arm 19 is adapted to extend at a level normally below the lower surface of an aircraft wing. Pivotally connected to the vertically disposed portion 17 of the frame 10 is an arm 20 which extends in substantially the same place as the arm 18 above the normally upper surface of an aircraft wing. Referring to Figure 3 of the drawings it will be seen that the arm 18 is pivoted to the frame portion 16 by means of a vertically disposed pin 21 which is journalled in an extending bracket 22 fixed on the frame portion 16. The arm 20 is likewise supported on the frame portion 17 by means of a pin 23 extending through a bracket 24. The arm 19 positioned directly below the arm 18 as shown in Figure 3 of the drawings and is pivotally connected to the frame portion 16 in a similar manner to the arm 18 by means of a bracket 25 illustrated in Figures 1 and 2 of the drawings. It will be observed from an examination of Figure 1 of the drawings that the arms 18, 19, 20 all extend in a substantially horizontal position and are each pivotally connected to the frame 10 on a substantially vertical axis. The construction of the arms 18, 19, and 20 is similar and therefore construction of the arm 18 only, will be described in detail.

This arm 18 is provided with two joint portions 26 and 27, hinged together by a pin 28 which is disposed on a substantially vertical axis. Secured to the arm joint 27 is a brace fixture 29 having an extending rod 30 adjustably connected to another brace fixture 31 secured on the joint 26 of the arm 18. Also connected to the fixture 29 in adjustable relationship therewith is a brace rod 32 which is supported near its opposite end by a fixture 33 secured to the cross member 7 which interconnects the frame portions 16 and 17 near their upper ends.

The fixture 29, referring now to Figure 5, is provided with an internally screw-threaded base 35 fixed to the arm joint 27. A rod supporting fixture 36 is provided with an externally screw-threaded stud 37 screw-threadably adjustable in the nut 35 permitting pivotal movement of the arm 30 about the vertical axis of the stud 37. The fixture 36 is provided with a screw-threaded recess 38 which screw-threadably supports an externally screw-threaded stud 39 of the fixture element 40 which is provided with an opening 41 through which the rod extends. A set screw 42 is screw-threaded in the fixture element 40 and intersects the opening 41 so that it bears upon the rod 32 for locking the same in position as desired. The fixture 31, as shown in Figure 1 of the drawing, is similar in construction to the fixture element 40 disclosed in Figure 5 of the drawing and is pivotally screw-threadedly engaged with a nut similar to the nut 35. The fixture 33 is shown in Figure 1 of the drawing is similar in construction to the fixture 31.

The arms 18, 19, and 20 support the conduits 43, 44 and 45, respectively. Since the support of all these conduits is similar, the support of the conduit 45 in connection with the arm 20 will be hereinafter described in detail. The conduit 45 is a hollow tubular member of considerable length capable of extending substantially the entire length of an aircraft wing. Carried by the conduit 45 are fog nozzles 46, 47, and 48 which are adapted to emit fluid fog in close proximity to structure of the airplane A. The nozzles may be adjustably carried by the conduit 45 to more readily adjust the pattern of the emitted fog relative to the structure of the aircraft. The conduit 45 is supported intermediate its ends by means of a fluid conducting support 49 which is illustrated in detail in Figure 4 of the drawing. The arm 20 is provided in its outermost joint with an opening 50 through which the shank 51 of the support 49 extends. Screw-threaded on the shank 51 is a jam nut 52 arranged to force the shoulder 53 of the shank 51 into fixed engagement with the lower side of the arm 20.

This arrangement provides for angular adjustment of the conduit 45 about the vertical axis of the shank 51. The conduit 45 extends through a transverse bore 54 in the support 49 wherein the conduit may be fused or otherwise sealed against leakage as desired. A conventional hose swivel connection 55 supports the hose 56 in communicative relationship with the bore 57 of the support 49 whereby fluid may pass through the tube 56 into the bore 57 and the opening 58 communicating with the interior of the conduit 45 as indicated by arrows in Figure 4 of the drawing. Hoses 59 and 60 communicate with the conduits 43 and 44, respectively, in a similar manner to the communication of the tube 56 with the conduit 45 hereinbefore described. The hoses 56, 59, and 60 all communicate with the manifold 61 which is connected to a supply pipe 62 having a quick acting valve 63 arranged to control the flow of fluid from a high pressure supply which enters the fire extinguishing apparatus in the direction as indicated by the arrow B.

It is contemplated that an apparatus of the present invention may be disposed adjacent each wing of the aircraft, and in such use the manifold 61 of each apparatus would be connected to a single quick acting valve for controlling fluid flow to each manifold.

The operation of the fire extinguishing apparatus is substantially as follows: when a fuel system test is being conducted in connection with the airplane A, as shown in Figure 1 of the drawing, the fire extinguishing apparatus may be moved into position longitudinally of the aircraft wing in the direction as indicated by the arrow C in Figure 1 of the drawing. The conduits 43 and 45 are substantially aligned with the leading and trailing edges of the aircraft wing and are located slightly thereabove as shown in Figure 2 of the drawings. The conduit 44 is positioned adjacent the leading edge of the wing and somewhat therebelow whereby the fog nozzles of the conduits 43, 44, and 45 are disposed along the entire length of the aircraft wing above and below the same permitting the emission of fog in surrounding relationship with the aircraft wing and adjacent the fuselage portion for entirely enveloping the same in the event a fire starts in that region.

It will be understood that the conduit 44 may be supported on either of the vertically disposed frame portions 16 or 17 in adjacent relationship to either the leading or trailing edge of the wing as desired. For example, the apparatus is shown located about the right wing of the aircraft A in which position the conduit 44 is in front of the airplane landing gear. This permits the airplane to be moved rearwardly from the apparatus and in the event it is desired to move the airplane forwardly without moving the apparatus the conduit 44 may be supported on the frame portion 17 rearwardly of the airplane landing gear permitting the airplane to be moved forwardly without disturbing the position of the fire extinguishing apparatus. It will also be understood that the fire extinguishing apparatus may be moved away from the airplane after a fuel test has been completed by rolling the frame 6 on the casters 11 in the direction as indicated by the arrow D in Figure 1 of the drawing.

While the apparatus is stationary position during operation thereof the casters 11 are locked so that the frame 6 may not be inadvertently moved with respect to the surface on which it is supported. The pivotal relationship of the arms 18, 19, and 20, relative to the frame portions 16 and 17 permits various dispositions of the arms 18 and 20, for example, in order to support the conduits 43 and 45 in certain spaced relation to accommodate aircraft wings of varying proportions. The brace rod 32 being typical structure for each of the arms 18, 19 and 20 maintains the angular relationship of the arms 18 relative to the frame 6. The arm 30 in connection with the fixtures 29 and 31 is adapted to maintain a certain fixed angular relationship of the arm joints 26 and 27 when pivoted relative to each other about the axis of the pin 28. The conduits 43, 44, and 45 may be pivotally adjusted on a vertical axis intermediate their ends by means of their supports which are of the same construction as the support 49 illustrated in Figure 4 of the drawings. The hoses 56, 59, and 60 are flexible and permit the angular adjustment of conduits 43, 44, and 45 during arrangement to accommodate aircraft of varying configurations. When the fire extinguishing apparatus is arranged in the position as shown in Figure 1 of the drawing and a fuel fire starts, a quick acting valve 63 may be opened permitting all of the nozzles in connection with the conduits 43, 44, and 45 to emit fluid fog which completely envelopes the aircraft wing and adjacent fuselage structure, thereby extinguishing the fire. This apparatus and method of extinguishing fires is very effective since it can be brought into operation very quickly and can be utilized to completely envelop the aircraft structure in fog almost instantly.

Although the now preferred embodiment of the present invention has been shown and described herein, it is to be understood that the invention is not to be limited thereto, for it is susceptible to changes in form and detail within the scope of the appended claims.

I claim:

1. A fire extinguishing apparatus, comprising: a wheeled frame adapted to be moved into close proximity to an aircraft to be protected against loss by fire; a plurality of elongated conduits adjustably mounted on said frame; a plurality of nozzles on each of said conduits adapted to dispense fluid therefrom; first means for supplying fluid under pressure to said conduits; and second means to control the flow of fluid from said first means to said nozzles, said conduits supported by said frame in such spaced relationship that they are adapted to extend in selected adjusted close proximity to the adjacent surfaces of the aircraft, whereby it may be completely enveloped by fluid fog dispensed by said nozzles when a fire breaks out.

2. A fire extinguishing apparatus, comprising: a wheeled frame adapted to be moved into close proximity to an aircraft to be protected against loss by fire; a plurality of elongated conduits each having a fluid conducting support intermediate its ends which is adjustably mounted on said frame; a plurality of nozzles adapted to dispense fluid from each of said conduits; first means for supplying fluid under pressure to said conduits; and second means to control the flow of fluid from said first means to said nozzles, said conduits supported by said frame in such spaced relationship that they are adapted to extend in selected adjusted close proximity to the adjacent surfaces of the aircraft, whereby it may be completely enveloped by fluid fog dispensed by said nozzles when fire breaks out.

3. A fire extinguishing apparatus, comprising: a wheeled frame adapted to be moved into close proximity to an aircraft to be protected against loss by fire; a plurality of elongated conduits each having a fluid conducting support intermediate its ends which is pivotally mounted on a substantially vertical axis on said frame; a plurality of nozzles adapted to dispense fluid from each of said conduits; first means having a manifold communicating with each of said supports for supplying fluid under pressure to said conduits; second means to control the flow of fluid from said first means to said nozzles, said conduits having flexible hoses interconnecting said fluid conducting supports and said manifold permitting adjustment of said conduits relative to said frame; and arms pivotally connected to said frame on substantially vertical axes and having said fluid conducting supports connected therewith at points distant from the pivotal connection of said arms with said frame; said arms and said fluid conducting supports maintaining said conduits in such spaced relationship that they are adapted to extend into close proximity with the adjacent surfaces of the aircraft whereby it may be completely enveloped by fluid fog dispensed by said nozzles when fire breaks out.

4. A fire extinguishing apparatus, comprising: a wheeled frame adapted to be moved into close proximity to an aircraft to be protected against loss by fire; a plurality of horizontally disposed arms pivotally mounted on substantially vertical axes in connection with said frame, each of said arms having a conduit pivotally mounted on an extending portion thereof and adjustable on a vertical axis; a plurality of nozzles adapted to dispense fluid from each of said conduits; adjustable brace means for fixing the pivotal relationship of said arms with said frame; manifold means having flexible hoses connected with said conduits for supplying fluid under pressure thereto; and second means including a quick acting valve to control the flow of fluid from said first means to said nozzles, said conduits arranged in substantially horizontal disposition and in such spaced relationship that they are adapted to extend in close proximity to the upper and lower surfaces of an aircraft wing structure whereby it may be completely enveloped by fluid fog dispensed by said nozzles when said quick acting valve is opened.

5. A fire extinguishing apparatus, comprising: a wheeled frame adapted to be moved into close proximity to an aircraft to be protected against loss by fire; a plurality of elongated conduits, each having a fluid conducting support intermediate its ends which is adjustably mounted on said frame; a plurality of nozzles adapted to dispense fluid from each of said conduits; first means for supplying fluid under pressure to said conduits; second means to control the flow of fluid from said first means to said nozzles, said conduits supported by said frame in such spaced relationship that they are adapted to extend in close proximity to the surrounding surfaces of an aircraft structure, whereby it may be completely enveloped by fluid fog dispensed by said nozzles when fire breaks out; arms pivoted on said frame and carrying said conducting supports in spaced relation to the pivotal axis of said arms at their connection with said frame, each of said arms having a pair of joint members pivotally and adjustably connected together on a substantially vertical axis; and means for fixing the adjusted relation of said joint members.

6. A fire extinguishing apparatus, comprising: a wheeled frame including a plurality of vertically extending support elements; a plurality of arms pivotally connected to each support element; means for holding each arm in a preselected position relative to said frame; at least one rigid conduit member pivotally connected intermediate the ends thereof to each arm; a plurality of nozzles carried by each conduit member; manifold means carried by said frame adapted to be flow-connected to a source of fluid under pressure; valve means for controlling flow of fluid to said manifold means; and flexible conduits flow-connecting said last named means to each of said rigid conduits, said frame being adapted to be wheeled into close proximity to an aircraft and the arms and rigid conduits adjusted to lay in preselected spatial arrangement relative to said aircraft whereby selected structure thereof may be enveloped by fluid fog dispensed from said nozzles when said valve means are opened to flow connect said manifold means with said source.

7. A fire extinguishing apparatus, comprising: a wheeled frame including a plurality of vertically extending support elements; a plurality of arms pivotally connected to each support element; means for locking each arm in a preselected position relative to said frame; a plurality of rigid conduits; pivotal means for mounting a conduit intermediate the ends thereof to each arm for movement relative thereto; a plurality of nozzles carried by each conduit; manifold means carried by said frame and adapted to be flow-connected to a source of fluid under pressure; valve means for controlling flow of the pressurized fluid to said manifold means; a plurality of flexible conduits leading from and flow-connected to said manifold means; and means carried by each pivotal means receiving an end of a flexible conduit and flow connecting said flexible conduit to said rigid conduit, said frame being adapted to be wheeled into close proximity to an aircraft and the arms and rigid conduits adjusted to lay in preselected spatial arrangements relative to said aircraft whereby selected structure thereof may be enveloped by fluid fog dispensed from said nozzles when said valve means are opened to flow-connect said manifold means with said source.

References Cited in the file of this patent
UNITED STATES PATENTS

| | | |
|---|---|---|
| 1,826,072 | Hamilton | Oct. 6, 1931 |
| 2,259,966 | Tappe | Oct. 21, 1941 |
| 2,331,373 | Campbell | Oct. 12, 1943 |